United States Patent
Thornberg

(10) Patent No.: US 8,230,722 B1
(45) Date of Patent: Jul. 31, 2012

(54) RESIDUAL GAS ANALYSIS DEVICE

(75) Inventor: Steven M. Thornberg, Peralta, NM (US)

(73) Assignee: Sandia Corporation, Albuquerque, NM (US)

( * ) Notice: Subject to any disclaimer, the term of this patent is extended or adjusted under 35 U.S.C. 154(b) by 310 days.

(21) Appl. No.: 12/724,476

(22) Filed: Mar. 16, 2010

(51) Int. Cl.
*G01M 3/34* (2006.01)

(52) U.S. Cl. .......................................... 73/49.3

(58) Field of Classification Search .............. 73/23.2, 73/40, 49.2, 49.3, 865.8, 31.02, 31.03, 73.52
See application file for complete search history.

(56) References Cited

U.S. PATENT DOCUMENTS

| | | | |
|---|---|---|---|
| 3,487,677 A * | 1/1970 | Molitor | 73/40.7 |
| 4,893,499 A * | 1/1990 | Layton et al. | 73/49.3 |
| 5,345,814 A * | 9/1994 | Cur et al. | 73/49.3 |
| 7,082,813 B2 | 8/2006 | Grosse-Bley et al. | |
| 7,178,385 B2 | 2/2007 | McCly et al. | |
| 7,240,536 B2 | 7/2007 | Beyer et al. | |
| 7,497,110 B2 | 3/2009 | Liperrt | |
| 7,597,013 B2 | 10/2009 | Carboneri et al. | |
| 2004/0020268 A1 * | 2/2004 | Hotta | 73/40.7 |

FOREIGN PATENT DOCUMENTS

TW 200912315 A * 3/2009

* cited by examiner

*Primary Examiner* — Peter Macchiarolo
*Assistant Examiner* — Jamar Ray
(74) *Attorney, Agent, or Firm* — Elmer A. Klavetter; Kevin W. Bieg

(57) ABSTRACT

A system is provided for testing the hermeticity of a package, such as a microelectromechanical systems package containing a sealed gas volume, with a sampling device that has the capability to isolate the package and breach the gas seal connected to a pulse valve that can controllably transmit small volumes down to 2 nanoliters to a gas chamber for analysis using gas chromatography/mass spectroscopy diagnostics.

9 Claims, 4 Drawing Sheets

| Sample | Nitrogen(%) | Oxygen(%) | Argon(%) | CO$_2$(%) | Hydrogen(%) |
|---|---|---|---|---|---|
| 1 | 98 | 0 | 1 | 1 | 0 |
| 2 | >99 | 0 | 0 | 0 | 0 |
| 3 | >99 | 0 | 0 | 0 | 0 |
| 4 | >99 | 0 | 0 | 0 | 0 |
| 5 | 98 | 0 | 0 | 0 | 2 |
| 6 | >99 | 0 | 0 | 0 | 0 |
| 7 | >99 | 0 | 0 | 0 | 0 |
| 8 | 99 | 1 | 0 | 0 | 0 |
| 9 | >99 | 0 | 0 | 0 | 0 |

FIG. 4

RESIDUAL GAS ANALYSIS DEVICE

This invention was made with Government support under Contract No. DE-AC04-94AL85000 awarded by the Department of Energy. The Government has certain rights in the invention.

BACKGROUND OF THE INVENTION

The present invention relates generally to a device and system for allowing analysis of gas volumes of less than one milliliter and more particularly to a system for obtaining small gas samples from sealed packages and analyzing ultra-small volumes.

In order to protect semiconductor chip devices from environmental hazards, device manufacturers have developed a variety of ways for hermetically encapsulating integrated circuit or discrete devices. Many of these techniques rely on adhesive, anodically bonded glass or low-temperature solder for low temperature sealing of a cover to a printed wiring board of a substrate including integrated circuits or discrete devices.

Hermetic encapsulation is required for a number of semiconductor devices. In particular, MEMS (microelectromechanical system) devices require hermetic sealing to ensure a long lifetime for the moving mechanical parts within them. Furthermore, this sealing may require the inclusion of getters and/or desiccants, without adversely affecting either the sealing or the getters and/or desiccants, to improve the mechanical or other reliability. Typical MEMS hermetic encapsulating techniques are awkward and costly. Consequently, the cost of MEMS hermetic encapsulation is comparable to or can exceed the cost of the fabrication of the MEMS wafer. Current techniques, as previously described, utilized for hermetic encapsulation of MEMS devices include soldering, eutectic metal bonding, and wafer fusion. It is therefore important that these MEMS packages be evaluated to ensure hermeticity. This is generally performed by selecting a sub-set sampling of packages that is statistically representative of a lot of produced MEMS packages and testing the sub-set of packages for hermeticity by performing a residual gas analysis on each package to determine if leakage has occurred. For example, if a MEMS package is hermetically sealed using nitrogen gas, the MEMS package can be destructively tested to determine if the gas inside the package contains any impurities that indicate a lack of hermeticity.

DESCRIPTION OF THE DRAWINGS

FIG. 4 shows gas analysis data on nine separate gas samples from MEMS packages.

DETAILED DESCRIPTION OF THE INVENTION

In the present invention, a sampling device is provided for holding a package that contains a small gas volume to be analyzed, wherein the sampling device is connected to a system that can analyze gas volumes down to several nanoliters. In one embodiment, the package is a microelectromechanical systems (MEMS) package. These packages are typically hermetically sealed with nitrogen gas, having gas volumes as low as approximately 10 nanoliters. The sampling device can hold packages with varying dimensions and geometries. A MEMS package is typically rectangular in shape with dimensions ranging from less than 1 mm to approximately 1 cm on a side. In order to determine if the hermeticity of a particular package has been compromised, the package must be isolated and the gas within the package released into an evacuated cavity and analyzed to determine if gases other than those originally sealed in the package are present.

Figure 1:
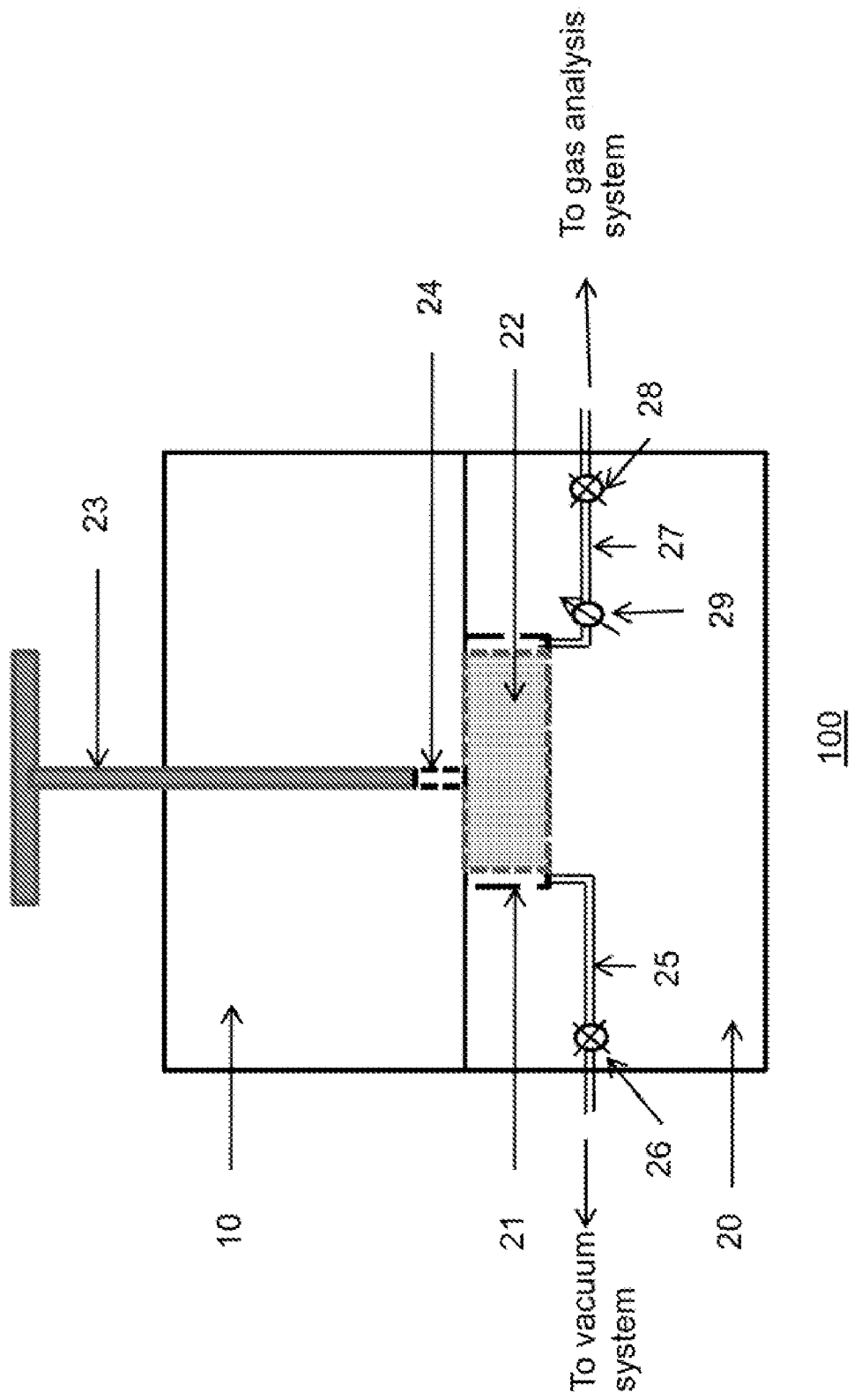
FIG. 1 illustrates one embodiment of the device of the present invention.

In one embodiment, the sampling device for holding the package must be capable of being sealed to a vacuum (typically to a pressure less than $10^{-8}$ Torr) to isolate the package, can be adaptable to hold a package of different geometries, must be capable of breaching the gas seal in the package, and must be capable of allowing the flow of small volumes of gas from the package to an external system for gas analysis. In one embodiment, the sampling device 100 consists of a top section 10 and a bottom section 20 that can be hermetically mated to the top section, thus providing isolation of the package. As depicted in FIG. 1, the bottom section comprises a cavity 21 into which the package 22 can be inserted. The cavity can be machined or otherwise formed to not only fit the geometry of the package but also to minimize any dead-space volume. The top section and bottom section can be hermetically mated and a means 23 is provided to stress the package such that the gas within the package is released. In FIG. 1, means 23 is a solid metal rod with a handle that can be moved through a hollow space 24 to impact the package 22. Means 23 can be a simple plunger or can be a screw device or other means by which to impact the package, stressing the gas seal in the package to breach it. The hermetically mated sections have fluidic connections between the cavity holding the package and the remainder of the system that analyzes the gas. The volume of these fluidic connections is also minimized and means are provided to isolate sections of these fluid connections from an external gas analysis system. In one embodiment, the total dead-space volume of the cavity situating the package and the fluidic connections from the cavity to both the vacuum system and the gas analysis system was less than approximately one milliliter. Optionally, a pressure measurement means is also provided within specified volumes of the sampling device. Fluidic connection 25 is between the cavity and a vacuum system and includes a means 26 (such as a standard valve) to allow connection to the vacuum system or to isolate the fluidic connection volume. Fluidic connection 27 is between the cavity and the external gas analysis system and includes a means 28 (such as a valve) to allow connection to the external gas analysis system or to isolate the fluidic connection volume. Pressure measurement means 29 has access to fluidic means 27 to allow measurement of the very small changes in pressure that occur when the gas seal in the package is breached. The materials used in forming the sampling device are generally metallic so as to not have material out-gassing and to provide leak-tight connections.

Figure 2:
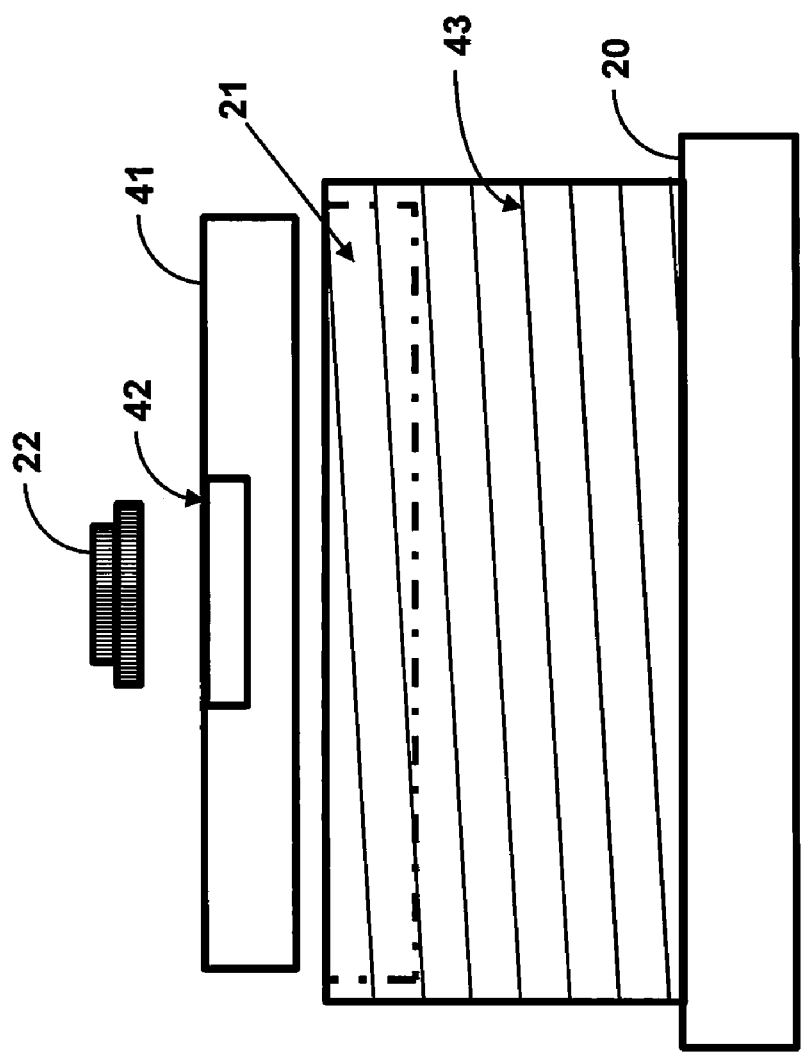
FIG. 2 illustrates a cylindrical insert in the bottom section of a device according to the present invention to situate a package to be tested

Because the packages, such as MEMS packages, have varying geometries, it is useful to have a sampling device that can accommodate varying geometries. In one embodiment, a manufactured insert is produced to both fit into the cavity of the bottom section and also to accommodate a package of a particular geometry. In one embodiment, a cylindrical disk 41 is manufactured that can fit into the cavity 21 of the bottom section 20 of the sampling device where the cylindrical disk 41 has a recessed opening 42 in the top surface into which the package 22 fits (see FIG. 2). This recessed opening 42 is designed to snugly fit the package and allow the package 22 to sit in the recessed opening at a height sufficient to allow pressure exerted from the top section of the device (not shown) to destructively breach the seal of the package and release the gas within the package. The recessed opening can be machined to minimize dead-space volume. The bottom section 20 is shown in this embodiment as having screw threads 43 to allow the bottom section to be screwed into the top section to facilitate hermetic mating.

In one embodiment, the top section of the sampling device comprises a valve handle and stem wherein, when the valve handle is turned, the valve stem extends longitudinally towards the package, impacting the package sufficiently to breach the seal and release the gas (see FIG. 1). In another embodiment, an insert in the top section is pushed into the package using gas pressure from an external source to impact the package and breach the seal.

In one embodiment, the top and bottom sections of the sampling device have screw threads that allow the two sections to be screwed together thereby mating the two sections. A metallic deformable diaphragm, made from a ductile material such as stainless steel, can be situated between the two sections to facilitate the hermetic mating of the two sections. The bottom section (containing the package) must contain a fluidic connection been the package to an external vacuum source such that the volume around the package can be sufficiently evacuated to eliminate unwanted gases that could comprise the analysis of the gas in the package. This fluidic connection must be able to be opened and closed, generally through the use of a valve. The bottom section must also provide for a fluidic connection to outside of the sampling device from the volume around the package to allow the gas released from the breach of the package to be transmitted outside the sampling device to the instruments used to analyze the gas from the package.

In one embodiment, the sampling device comprises an off-the-shelf valve that comprises the bottom and top sections. The bottom section of the valve is machined to provide a sufficient volume cavity to accommodate a cylindrical disk that is manufactured to fit into this volume cavity and to accommodate the package. The bottom section is machined to provide the necessary fluidic connections between the package volume and an external vacuum source as well as to the external gas analysis elements. To facilitate these fluidic connections, in one embodiment, the sampling device is fluidically connected to a connection element, which both facilitates the fluidic connection from the sampling device to an external vacuum system and facilitates the fluidic connection from the sampling device to the external gas analysis elements. This connection element comprises a means, such as a valve, for initiating and completing a vacuum on the volume surrounding the package.

Figure 3:
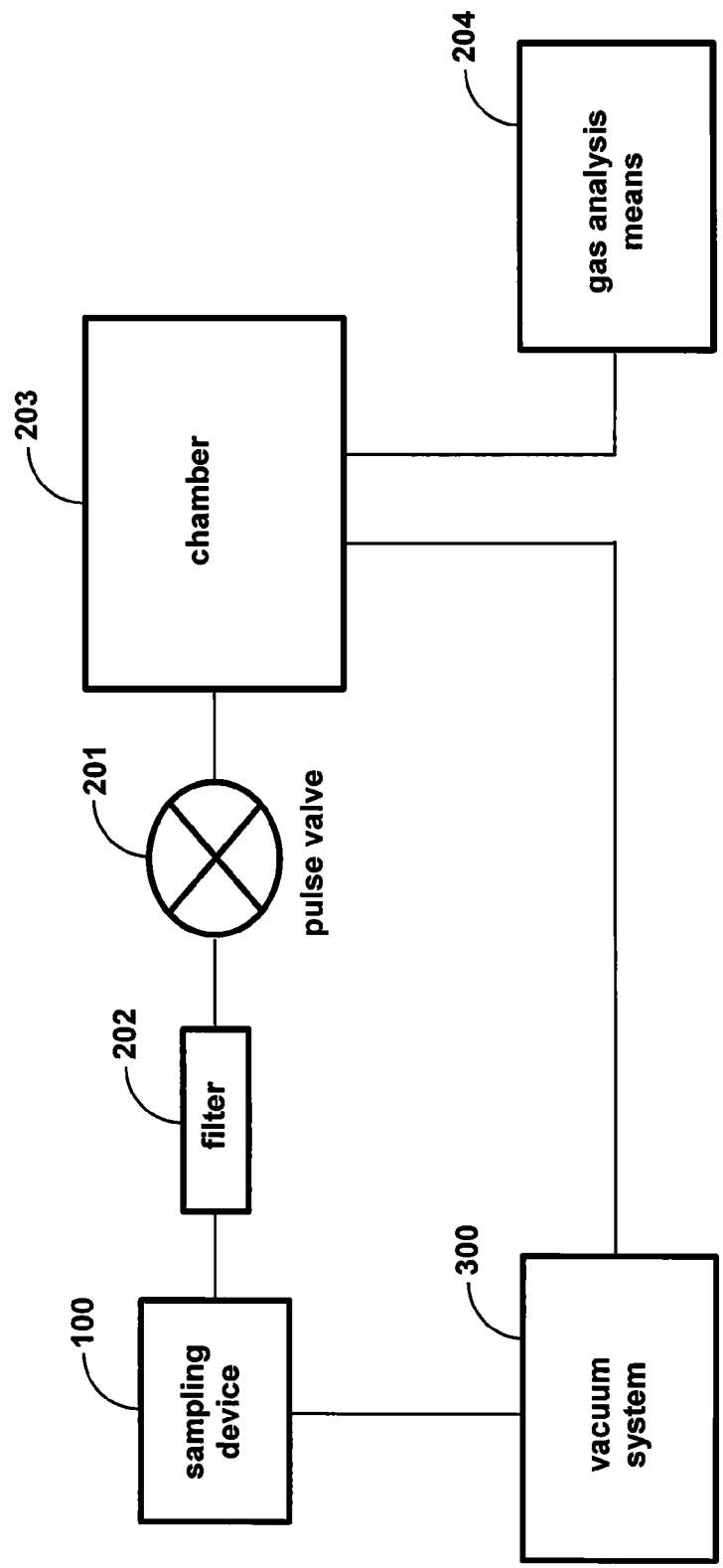
FIG. 3 shows a schematic of the components of the system used to determine hermeticity of packages containing small gas volumes.

In one embodiment, the invention is a system to test the hermeticity of a package; that is, a system to test whether a particular package or component has had a leak in a sealed gas volume in the package. The system, illustrated in FIG. 3, comprises the sampling device along with a vacuum system 300 and a gas analysis system connected to the sampling device. In one embodiment, the vacuum system 300 is connected to the sampling device 100 to allow evacuation of the volume of sampling device that comprises the cavity as well as the fluidic connections. The sampling device is fluidically connected to the gas analysis system. The component of the gas analysis system first connected to the sampling device is a pulse valve 201 that can allow controlled picoliter-scale aliquots of gas to be transmitted fluidically from the sampling device to a chamber where the gas composition can be analyzed. Optionally, a filter 202 can be situated between the pulse valve and the sampling device. The pulse valve is electronically controlled to release small volumes of gas from the package, ranging from 2 nanoliters up to 1 milliliter or more, to a chamber used to analyze the composition of the gas. This electronically controlled pulse valve 201 allows for repeated, statistically meaningful sampling and subsequent composition determinations to be made. The chamber 203 into which the gas is transmitted is fluidically connected to the vacuum system such that the chamber can be first evacuated, generally down to less than $10^{-9}$ Torr. After the package gas is transmitted into the chamber, the gas is analyzed by standard gas diagnostic instrumentation 204, such as a gas chromatograph (GC) and/or mass spectrometer (MS), to determine the gas composition. The resulting gas composition information can be transmitted optionally to an electronic storage or display device.

One embodiment of the device and system of the present invention was used to determine the hermeticity of the multiple MEMS packages. A custom-made cylinder was machined to situate a single MEMS package in a recessed opening and the cylinder was situated in a modified valve assembly, similar to that illustrated in FIG. 1. A screw-type handle in the top section of the device was used to breach the gas seal in the MEMS package. The released gas from the package was introduced into the gas analysis chamber using a pulse valve that allowed for controlled, repeated small volumes of gas to be transmitted from the device containing the package to the chamber. The gas was analyzed in the chamber using a standard MS diagnostic system. The gas pressure internal to the sealed gas volume of the MEMS package was estimated using Charles' Law, after measuring the pressure in the device using the pressure measurement means 29 (see FIG. 1) after seal breaching and knowing the sealed gas volume of the MEMS package as well as the relevant volume in the device where the pressure measurement was taken. For each package, several gas volumes were able to be tested using the controlled release capabilities of the device and system of the present invention. FIG. 4 shows one example where nine separate gas volumes were analyzed from the gas breached in nine MEMS packages; the analysis showed that the gas composition was essentially pure nitrogen, indicating in this instance that the original gas seal had not been leaking prior to the destructive breaching in the devices. The volume of the gas in the MEMS package was only approximately 30 nanoliters, with the results demonstrating that the system of the present invention is useful in determining hermeticity in packages having very small internal volumes.

The invention being thus described, it will be apparent to those skilled in the art that the same may be varied. Such variations are not to be regarded as a departure from the spirit and scope of the invention, and all such modifications are intended to be included within the scope of the following claims.

I claim:
1. A device, comprising:
a top section and a bottom section, said bottom section comprising a top surface, said top surface having a cavity into which a package is situated, said package having a sealed gas volume, said top section mated to the top surface of said bottom section to hermetically seal said cavity; and a plunger or screw device for hermetically breaching the sealed gas volume of said package; and wherein said device is fluidically connected to a vacuum system and a pulse valve, said pulse valve fluidically connected to a chamber, and said chamber connected to a gas analysis means.

2. The device of claim 1 wherein said cavity is fluidically connected to a pressure measurement device.

3. The device of claim 1 wherein said gas analysis means is a gas chromatograph.

4. The device of claim 1 wherein said gas analysis means is a mass spectrometer.

5. The device of claim 1 wherein a filter is fluidically connected between said device and said pulse valve.

6. The device of claim 1 wherein said pulse valve can release volumes of gas from said device to said gas chamber in the range of 2 nanoliters to 1 milliliter.

7. The device of claim 1 wherein a cylindrical disk is situated into said cavity, said cylindrical disk having a top surface with a recessed opening into which the package is situated.

8. The device of claim 1 wherein said vacuum system has a capability of producing a vacuum of less than $10^{-8}$ Torr in said device.

9. The device of claim 1 wherein the top section and bottom section have screw threads that allow the top section and bottom section to be screwed together to mate the top section and bottom section to provide a hermetic seal.

* * * * *